United States Patent [19]
Warstat

[11] 3,732,775
[45] May 15, 1973

[54] PRISM VIEWFINDER FOR MIRROR REFLEX CAMERAS

[75] Inventor: Hans Warstat, Stuttgart, Germany

[73] Assignee: Fritz Victor Hasselblod, Goteborg, Sweden

[22] Filed: Apr. 20, 1971

[21] Appl. No.: 135,728

[30] Foreign Application Priority Data

Apr. 30, 1970 Germany..................P 20 21 179.4

[52] U.S. Cl..................88/1.5 R, 95/10 C, 95/11 V, 95/42, 356/219
[51] Int. Cl................................................G01j 1/16
[58] Field of Search.....................356/209, 218, 219; 88/1.5 R; 95/10 C, 11 V, 42

[56] References Cited

FOREIGN PATENTS OR APPLICATIONS

| 240,218 | 8/1962 | Australia.................................88/1.5 |
| 1,274,437 | 8/1968 | Germany..............................356/219 |

Primary Examiner—Ronald L. Wibert
Assistant Examiner—F. L. Evans
Attorney—Sommers & Young

[57] ABSTRACT

In a prism viewfinder for mirror reflex cameras having the roof edge of the prism displaced from and opposite to the ray incidence surface of the prism and a plane mirror surface substantially parallel to the ray incidence surface, laterally displaced from and within the range between the roof edge and the ray incidence surface and adapted to direct the ray path out of camera whereby the direction of emergence of the ray path forms an angle of about 45° with respect to the direction of incidence of the ray path; the improvement in which at least the galvanometer of an electric exposure meter is substantially disposed between the plane mirror surface and a plane passing through the ray incidence surface. In the preferred embodiment, a viewfinder adjusting disc is combined with a field lens on the opposite side of the ray incidence surface and spaced therefrom, and measuring circuit components of the exposure meter are substantially disposed between the plane mirror surface and a plane passing through the adjusting disc.

16 Claims, 2 Drawing Figures

PRISM VIEWFINDER FOR MIRROR REFLEX CAMERAS

This invention relates to a prism viewfinder for mirror reflex cameras of the type having a prism the roof edge of which is located in opposed relation to the ray incidence surface of the prism and also having a plane mirror surface located laterally of the prism in the range between said roof edge and said ray incidence surface, which plane mirror surface extends substantially in parallel with said incidence surface and directs the ray path out of the prism at an inclination of about 45° to its incidence direction.

In a known prism viewfinder of the aforesaid type, the prism body is adjusted fixedly in relation to the ray path extending therein, and is enclosed in a housing. The viewfinder is designed as a complete assembly unit and is detachably attached to the camera.

The present invention has as its object to equip a viewfinder of the aforesaid type with an electric exposure meter, without appreciably changing the total outline and dimensions of the viewfinder housing.

The invention is characterized in that, in a viewfinder of the type referred to in the introductory portion and in the space extending substantially between the plane mirror surface and its opposed plane including the ray incidence surface, there is provided at least the galvanometer of an electric exposure meter. Thus, to have the physically largest component of the meter, a space has been chosen which serves a new purpose by a mere a change of the external viewfinder shape in the direction to the camera body. Such a change, therefore, does not have any disturbing effect on the operation of viewfinder and camera. The resulting construction, furthermore, is compact and favorable for the design of an ever-ready-case. The location of the gabanometer in the aforementioned space provides the advantage, that the moving pointer of the gabanometer can be made visible in an advantageous manner within the range of the viewfinder ray path, for example by placing the pointer so that it projects into the edge zone of the ray incidence surface of the prism.

When a viewfinder adjusting disc, possibly in combination with a field lens, is prearranged in the ray incidence direction to the ray incidence surface of the prism, it is further possible to utilize additionally the space between the planes including the ray incidence surface of the prism and, respectively, the adjusting disc for housing the galvanometer and/or components of the associated measuring circuit comprised in the exposure meter.

It further is of advantage to the current source or battery of he exposure meter in this same place, i.e. in the space where the galvanometer is located.

The invention is described in greater detail in the following by way of an embodiment. Further advantageous embodiments of the invention are referred to in connection with the description and in the claims.

Figure 1:
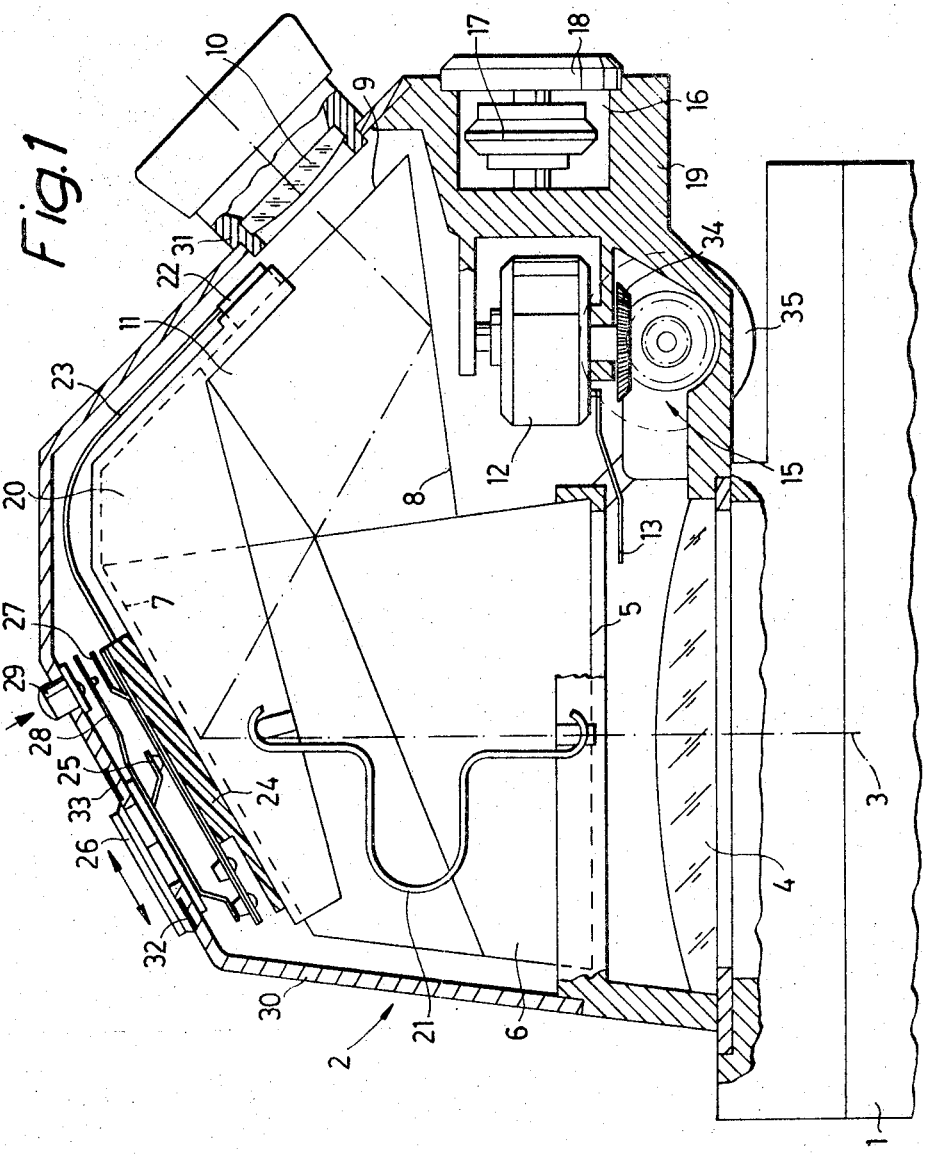
FIG. 1 shows by way of section a lateral view of a prism viewfinder.

As shown in FIG. 1, on the upper portion 1 of a mirror reflex camera, a prism viewfinder, generally designated by 2, is mounted stationary or exchangeably. A dash-dotted line 3 indicates the viewfinder ray path, which extends from the camera 1, passes through an adjusting disc designed as a field lens 4, enters a viewfinder prism 6 through a ray incidence surface 5 and is directed from the roof edge 7 of said prism to a plane mirror surface 8, which reflects the ray path through an emergence plane 9 and an eyepiece 10 into the observer's eye. The planes 8 and 9 are located on a second prism 11 fastened by putty on the prism 6. The prisms 6 and 11 may also be combined to form a single prism body. The ray path emerging from the plane 9, as can be seen, extends at an inclination of about 45° to the ray path entering the plane 5, and the plane mirror surface 8 is located laterally within the range between the roof edge 7 and the ray incidence surface 5 and extends substantially in parallel with the latter.

The prism viewfinder 2 is equipped with an electric exposure meter, the galvanometer 12 of which, according to the invention, is located in the space extending between the plane mirror surface 8 and a plane including the ray incidence surface 5. The pointer 13 of the galvanometer projects into the edge zone of the ray incidence surface 5, in a place such that an observer looking into the viewfinder eyepiece can distinctly recognize the pointer at the edge of the viewfinder image, together with a correlated scale 14, see FIG. 2.

In the viewfinder shown, the adjusting disc designed as a field lens 4 is prearranged to the ray incidence surface 5. The space between the planes including the ray incidence surface 5 and, respectively, the plane surface of the field lens 4, is utilized for housing a differential gear 15 (FIG. 2), by means of which the galvanometer 12 and its pointer 13 is mounted as an entirety rotatable about the pointer shaft. Said space further includes, adjacent the galvanometer 12, a chamber 16 in which a current source or battery 17 for the exposure meter is held between contact springs. The chamber 16 is closed by a detachable cover 18.

Figure 2:
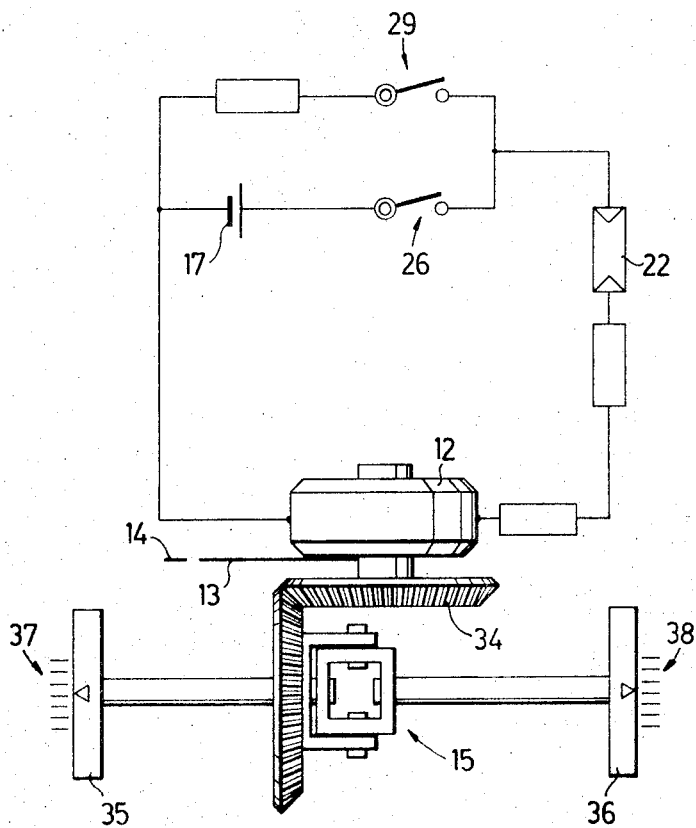
FIG. 2 shows a wiring diagram of the electric exposure meter.

The lens 4, prism 6, 11, gabanometer 12 and current source 17 are mounted in a frame-like housing portion 19. The prism 6, 11 is secured thereto and, on its edge roof 7 is placed a support 20 corresponding in shape to said edge roof, with clamping springs 21 being fixed at the other end of the housing portion 19 to engage with lugs or the like on opposed portions of said support. The support 20 includes a portion, which extends to the range of the ray emergence plane 9 and at which is formed a holder for a light-sensitive means 22 of the exposure meter. Said means 22 is subjected to the brightness of the viewfinder ray path reflected by the plane mirror surface 8, and is connected by a cable 23 to electrical components mounted on said support 20. One of said components, the contact switch plate 24 of insulation material, is shown in FIG. 1. The plate includes contact surfaces with coact with a contact spring 25 fastened to a switch slide 26. On said plate 24 there is further attached a contact spring 27 with a resilient counter-contact 28, which can be actuated by an operation key 29. The switch slide 26 and the operation key 29 are mounted in a housing cap 30, which is secured to the housing portion 19 and covers the prism 6, 11 and which carries the fitting 31 of the viewfinder eyepiece 10. Two setting signs 32 (On) and 33 (Off) on the housing cap 30 are so correlated to the switch slide 26 that only the sign indicating the actual switch condition is visible, while the other sign is covered by the switch slide 26. The switch actuated by the switch slide 26, as can be seen in FIG. 2, switches the exposure meter on and off, while the switch which is closed by the operation key 29 as long as the key is held impressed, switches in a test circuit for the meter. This test circuit indicates the operability of the meter by a definite deflection of the pointer 13 only when simultaneously the switch 25, 26 are in the On position.

FIG. 2 further illustrates in detail the differential gear 15 for setting the gabanometer 12, which is mounted on a bevel gear 34 constituting the outlet part of the differential gear, which has as inlets the adjusting buttons 35 and 36. The adjusting button 35 can be indexed according to a film sensitivity value scale 37, thereby giving the galvanometer the pre-setting relative to the scale 14 which corresponds to the sensitivity scale value. When using the viewfinder in a single-lens reflex camera with interchangeable lenses of different speed, and when exposure metering with an aperture being always wide open, the light stream meeting the light-sensitive means 22 is influenced corresponding to the speed of the lens. This influence can be paid regard to by the adjusting button 36, in such a manner, that the button can be indexed according to a scale 38 of the highest aperture values of the interchangeable lenses and thereby presets the galvanometer 12 in correspondence with the value. The two adjusting buttons 35 and 36, shown in FIGS. 1 and 2, are disposed on opposed lateral surfaces of the prism viewfinder 2. The value in question of the scale 14 indicated by the pointer 13 of the galvanometer 12 can be transferred manually to the light-value setting means on the camera side.

What I claim is:

1. In a prism viewfinder for mirror reflex cameras of the type having a prism the roof edge of which is displaced from and opposite to a ray incidence surface of said prism, and also having a plane mirror surface disposed substantially parallel to said ray incidence surface and laterally displaced therefrom within the range between said roof edge and said ray incidence surface to direct the ray path out of said camera in a direction of emergence which forms an angle of about 45° with respect to the direction of incidence of said ray path; the improvement wherein an electric exposure meter, comprising a galvanometer electrically coupled to a measuring circuit, is incorporated into said prism viewfinder, at least the galvanometer of said electric exposure meter being substantially disposed in the space between said plane mirror surface and a plane extending from and substantially parallel to said ray incidence surface.

2. A prism viewfinder in accordance with claim 1 in which said viewfinder includes an adjusting disc mounted in a plane parallel to and spaced from the ray incidence surface of said prism, at least a portion of said measuring circuit being substantially disposed between the plane mirror surface and the plane in which said adjusting disc is mounted.

3. A prism viewfinder in accordance with claim 2 wherein the viewfinder adjusting disc comprises a field lens.

4. A prism viewfinder in accordance with claim 2 wherein said galvanometer includes a movable pointer positioned to extend into the edge zone of said ray incidence surface.

5. A prism viewfinder in accordance with claim 4 wherein said galvanometer is mounted for rotation about an axis which coincides with the axis of said pointer, and setting means for adjusting the rotational position of said galvanometer and pointer.

6. A prism viewfinder in accordance with claim 1 including a current source for the measuring circuit of said exposure meter, said current source also being disposed in said space between the plane mirror surface and the plane extending from said ray incidence surface.

7. A prism viewfinder in accordance with claim 1 including a light sensitive means in said measuring circuit of said exposure meter, said light-sensitive means being supported adjacent a surface of said prism.

8. A prism viewfinder in accordance with claim 1 wherein said prism supports electrical switch means forming a portion of the measuring circuit of said exposure meter.

9. A prism viewfinder in accordance with claim 1 including a support member mounted on the prism roof edge.

10. A prism viewfinder in accordance with claim 9 wherein said measuring circuit includes a light sensitive means mounted on said support member.

11. A prism viewfinder in accordance with claim 9 including switch means mounted on said support member, said switch means comprising a portion of said measuring circuit.

12. A prism viewfinder in accordance with claim 9 wherein a portion of said support member projects into the ray emergence range of said prism.

13. A prism viewfinder in accordance with claim 11 wherein said switch means comprises switch contacts mounted on said support member, and actuating means for said contacts mounted on a housing cap covering said prism.

14. A prism viewfinder in accordance with claim 9 including a common housing for said viewfinder and exposure meter, and spring means extending between said housing and said support member.

15. A prism viewfinder in accordance with claim 14 wherein said housing includes a removable cap, and an eye piece mounted on said cap.

16. A prism viewfinder in accordance with claim 1 including means for detachably mounting said viewfinder on the camera.

* * * * *